(12) United States Patent
Ray, II

(10) Patent No.: US 6,427,685 B1
(45) Date of Patent: Aug. 6, 2002

(54) DEVICE TO FACILITATE THE PERFORMANCE OF CARDIOPULMONARY RESUSCITATION

(76) Inventor: Philip W. Ray, II, 13441 SW. 97th Ct., Miami, FL (US) 33176

( * ) Notice: Subject to any disclaimer, the term of this patent is extended or adjusted under 35 U.S.C. 154(b) by 0 days.

(21) Appl. No.: 09/536,430

(22) Filed: Mar. 27, 2000

(51) Int. Cl.$^7$ .............................................. A61M 15/00
(52) U.S. Cl. .................. 128/200.24; 434/265; 434/262
(58) Field of Search ....................... 128/200.24; 434/81, 434/90, 262, 265, 267

(56) References Cited

U.S. PATENT DOCUMENTS

| | | |
|---|---|---|
| 4,019,501 A | 4/1977 | Harris |
| 4,077,400 A | 3/1978 | Harrigan |
| 4,355,634 A | 10/1982 | Kanter |
| 4,554,910 A * | 11/1985 | Lally ........................... 601/41 |
| 4,559,940 A | 12/1985 | McGinnis |
| 4,797,104 A * | 1/1989 | Laerdal et al. ............... 434/265 |
| 4,809,683 A | 3/1989 | Hanson |
| 4,850,876 A * | 7/1989 | Lutaenko et al. ............ 434/265 |
| 4,863,385 A | 9/1989 | Pierce |
| 4,944,291 A | 7/1990 | Robertson, II et al. |
| 5,496,257 A | 3/1996 | Kelly |
| 5,645,522 A | 7/1997 | Lurie et al. |
| 5,657,751 A | 8/1997 | Karr, Jr. |
| 5,931,304 A | 8/1999 | Hammond |

* cited by examiner

Primary Examiner—Glenn K. Dawson
(74) Attorney, Agent, or Firm—Malloy & Malloy, P.A.

(57) ABSTRACT

An alignment device in the form of a flexible material disk having a planar configuration is removably adhered to the sternum of a person on whom cardiopulmonary resuscitation (CPR) is being performed, wherein the disk includes indicia formed on an outer surface thereof. The indicia is at least partially defined by an alignment indicator disposed and configured to accurately orient the disk on the person in a position which facilitates the proper performance of CPR. The indicia further includes a position indicator disposed and oriented to indicate the accurate positioning of at least one hand of one performing the CPR on the person. The indicia may also include instructional information setting forth the required or preferred step necessary to correctly perform CPR. One or more of the disks may be included in a kit assembly along with other components or products intended to facilitate the performing of CPR. Each of the plurality of disks are structured for use on a person within a different age group, and further wherein each of the plurality of disks include collectively variable indicia so as to set forth the correct procedural steps in performing CPR on individuals or persons within a particular age group.

28 Claims, 4 Drawing Sheets

DEVICE TO FACILITATE THE PERFORMANCE OF CARDIOPULMONARY RESUSCITATION

BACKGROUND OF THE INVENTION

1. Field of the Invention

This invention is directed to a device which facilitates the proper performance of cardiopulmonary resuscitation (CPR), particularly by untrained or semi-trained individuals and includes the use of at least one alignment device including a disk having indicia formed thereon which indicates the proper alignment of the device on a person's body as well as the accurate positioning of at least one hand of the individual performing CPR, relative to the sternum of the person on whom CPR is being performed. The disk and associated indicia are adapted to accommodate different sizes and age groups of patients and may further include instructional information relating to performance of the CPR procedure. One or more of the devices may be included in a kit assembly along with other products which facilitate the performance of CPR.

2. Description of the Related Art

By most reliable accounts, the concept and practice of emergency care originated in France, during the period of Napoleon, when medical personnel first began to enter the battlefields for the express purpose of retrieving and providing care for wounded military personnel. From that period on, the principle of providing early aid or emergency medical services to the wounded grew fairly rapidly among the military services around the world. Sometime later, around the mid to late eighteen hundreds, the concept of making emergency treatment available to the general population, rather than just to the military, began to be implemented in various countries throughout the world, including the majority of most of the larger American cities. Of course, the quality and availability of emergency medical aid which was provided was rudimentary by today's standards. For example, the transporting of the critically ill by horse and buggy was less than a satisfactory means of transportation, but did play a significant roll in the development of the modern day ambulance services, which are called upon to respond to those in acute need of emergency medical services. As American cities continued to grow, the need for better trained medical personnel became evident. In particular, it became apparent that proper response to emergency medical situations required the presence of personnel which were well trained to handle a number of critical medical conditions. Eventually, legislation was passed to require state and municipal agencies to mandate more efficient and capable systems to provide emergency care to the general population.

The providing of medical services and care on an emergency basis has currently developed to the point where such services are almost taken for granted. In recent years a universal telephone number "911" has become recognized by the majority of the population, as an emergency call number on which people can rely for immediate response in the treatment of critical or life threatening situations. However, in spite of the significant advances and reliable performance of emergency care services which have developed over the last 150 years, thousands of lives are still lost each year due to the fact that emergency medical treatment was not performed immediately. By way of example, people who experience cardiac arrest must receive immediate treatment, in order for their lives to be saved.

Therefore, there is an increasing effort throughout the United States, as well as most modern, industrialized countries of the world, to make the general population more aware of certain medical procedures which may be performed particularly, but not exclusively, on a person suffering from cardiac arrest. More specifically, the performing of cardiopulmonary resuscitation or "CPR" on cardiac arrest victims within the first few minutes immediately following the cardiac arrest attack, is a significant factor in the saving of a victim's life. However, CPR must be performed correctly and sustained until the patient receives advanced life support procedures by well trained and certified medical personnel.

Currently, an increasing number of people are being made aware of the importance of immediate treatment being given to cardiac arrest victims. As a result, more and more people are receiving at least some training in first aid and/or CPR procedures. Naturally, the better trained an individual is the more prepared that individual would be to help others in a critical or emergency medical situation. However, not everyone has the time or inclination to proceed with a formal training program or become certified by attending classes offered by the American Red Cross, or other medical facilities around the country. Due to the fact that CPR is not an extremely complicated procedure, it is possible to perform its various steps properly and accurately, at least in extremely critical situations, with a minimal amount of instruction, as long as the instruction provided is accurate and effectively presented.

By way of example, cardiopulmonary resuscitation is applied in the following manner. If a person appears to be in cardiac arrest, simple steps can be followed which could result in the saving of a person's life. As a first step, the victim must be properly evaluated by observing and determining whether the patient is breathing. The individual attempting to apply CPR should place his or her face near the mouth of the victim, while at the same time viewing the chest area to see if there is any movement. Concurrently, the pulse of the victim should be checked preferably by placing the finger tips on the victim's Adam's apple and sliding the fingers into the groove immediately adjacent to the windpipe. If there is no response and neither breathing nor a pulse can be detected, a preliminary step would be to arrange for immediate medical services to arrive as soon as possible, such as by calling "911".

In the actual application of CPR the victim is placed flat on his or her back on a solid surface. The individual applying CPR assumes a generally kneeling position by the side of the victim. The victim's head is tilted backwards simultaneously as the victim's chin is lifted upwardly. The nose and accordingly the airway associated therewith, is closed by the hands of the individual applying CPR. Two breaths are forced through the mouth of the victim into the lungs, using procedures normally associated with "mouth-to-mouth" resuscitation. Two full breaths must be applied to an adult victim while observing a lifting of the victim's chest, which is indicative of the victim receiving enough air. If available, the individual performing CPR may wish to use some type of breathing apparatus which prevents or at least partially restricts actual mouth-to-mouth contact of the individual and the victim, in order to reduce the possibility of cross-contamination or the exchange of bodily fluids. Next, a predetermined number of "compressions" are performed on the victim, with at least one hand of the individual applying CPR being properly oriented on the victim's chest according to the victim's age. The hands of the individual are positioned in the center of the chest generally on the lower half of the sternum. One hand is placed on top of the other and a downward "pumping" motion is applied to the victims's chest. Such motion should be a consistent, straight, up and down motion applied to the victim's chest while the individual performing CPR maintains a kneeling orientation with his or her arms extended downwardly from the upper torso. The chest of the victim should be compressed approximately two inches and the rate of compressions should average approximately 15 compressions followed by two "ventilations" or breaths. The ratio of compressions to breaths or ventilations should change depending on the size and accordingly the age of the victim, to the extent that a ventilation is applied to younger or smaller victims more frequently and generally after approximately every 5 compressions.

While the above procedure may initially appear to be complicated, it most certainly could be followed in certain critical emergency situations by most people capable of demonstrating a certain amount of control and calmness in such situations. As set forth above, advanced training is not an alternative to a vast majority of the population. Therefore, there is a recognized need for an instructional aid or device which will facilitate the performance by an individual, who is untrained or only minimally trained, of the various steps comprising CPR. Of course, if any such instructional device were provided, it would ideally also serve as a useful reminder or refresher for those people who are well trained and certified in the administering of CPR, as even some trained persons may become unnerved and perhaps forgetful during an emergency situation. Further, such a device could be incorporated within a kit assembly and thereby associated with other of a plurality of components to further facilitate the performance of CPR, as well as the care and conditioning of the victim and/or the individual performing the CPR procedure, both before and after its application. If any such kit assembly were developed, it would preferably have a compact design so as to be readily stored in rather small but handy places, such as in the glove box of an automobile or boat, etc. or in a briefcase, purse, etc., and further, the components of the kit assembly would ideally be color coded or otherwise coded so as to facilitate and expedite proper use in an emergency situation.

SUMMARY OF THE INVENTION

The present invention relates to a device which is structured to facilitate the performance of cardiopulmonary resuscitation (CPR) especially by those individuals who are relatively untrained, only partially trained or fully trained and, as a result may require some type of alignment and positioning facility in order to be properly oriented, relative to a person on whom CPR is being performed. The present invention also comprises a kit assembly including one or more of the alignment devices for a variety of ages, as well as other components or products, which also aids the performance of CPR and/or the associated treatment of a person on whom CPR is being performed. More specifically, the aforementioned device comprises a disk preferably formed of a flexible material and being dimensioned and configured to overlie and engage the frontal area of a person's body in predetermined, aligned relation to the sternum. In addition, the flexibility of the material from which the device is formed should be sufficient to effectively allow the disk to generally conform to the contours of the frontal body portion, in order that an accurate positioning and/or alignment of one or more hands of one performing CPR, can be directly disposed on the person being treated.

While the disk may have other configurations, one preferred configuration is the inclusion of a circular peripheral edge disposed in surrounding relation to a remainder of the disk and disposed in co-planar relation therewith. The disk, even though it is made from a flexible material, is structured to normally assume a planar configuration and includes, an outer exposed surface and an under surface. One feature of the present invention is the inclusion of indicia formed on the outer surface of the disk in a position which is readily observable. The indicia, depending upon the particular embodiment of the alignment device utilized, comprises at least one alignment indicator and preferably, at least one position indicator. The alignment indicator is dimensioned, configured and disposed on the outer surface in a manner which serves to accurately orient the disk and the outer surface in aligned relation to a predetermined portion of the body of the person being treated. The aforementioned position indicator is cooperatively structured with the alignment indicator and is disposed relative thereto so as to provide an accurate indication as to the location of at least one hand, preferably the heel of one hand, of an individual performing the CPR procedure. Therefore, the cooperative structuring of the alignment indicator and the position indicator facilitate the proper performance of the CPR procedure by aiding an individual in the placement of one of his or her hands, for purposes of applying repeated compressions as part of the conventionally recommended CPR procedure.

Another feature of the present invention is the inclusion of instructional information, which also may define a part of the aforementioned indicia, formed on the outer surface of the disk. The instructional information may comprise specific, step by step instructions in the proper performance of CPR or alternatively may provide a more generalized outline of the various steps required as well as a partially preliminary procedure to follow prior to the actual application of the plurality of compressions/ventilations, which are typically included in the performance of CPR. Such preliminary procedure may include the calling of the universal number "911", the examination of the person being treated to insure that a clear unobstructed airway has been established and to determine whether the person is breathing or not. In addition, the pulse of the person being treated may also be included as a preliminary step to performing CPR.

It should be apparent that different procedures, at least in terms of the ratio of compressions and ventilations applied to a person, is greatly dependent upon the age and accordingly the size of the person. By way of example, a different ratio of compressions to ventilations are recommended for a child, between the ages of 1 through 8 than an adult or a person being older than 9 years. Also, extremely small individuals, such as young infants less than 1 year of age may require a different technique and compression/ventilation ratio applied thereto. Also due to the fact that size of such an infant would be significantly smaller than that of an adult, the aforementioned indicia defining the alignment indicator and/or position indicator may be different from that used with an adult. Therefore, the present invention would most preferably incorporate a plurality of disks, wherein the indicia formed thereon and/or the dimension and configuration of the individual disks are specifically designed for application to a person within a specified age group, which is indicative of the size of the individual.

Accordingly, the present invention preferably also comprises a kit assembly including at least one of the aforementioned disks having indicia formed on an outer surface thereof as well as other components or devices which will facilitate an individual in the proper performance CPR and the care of a person before and after such procedure. Such kit assembly may comprise at least one pair of surgical or examination gloves formed of a latex or other applicable material and preferably having a powder material applied thereto, so as to facilitate the donning of the gloves to the hands of an individual. In addition, in order to avoid contamination and otherwise render the performance of the plurality of repeated ventilations more palatable, a breathing apparatus may be included within the kit assembly. The breathing apparatus may take a variety of different structural configurations including a mask structure having at least a one way valve so as to regulate air flow between the individual performing the CPR and the person being treated.

In addition to the above, the kit assembly of the present invention can include one or more "wipes" or towelettes formed from a natural cloth or synthetic paper or cloth material and being infused with antiseptic fluid such as, but not limited to a diluted concentration alcohol or the like.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3-A is an illustration of an alternative embodiment for that shown in FIG. 3.

Like reference numerals refer to like parts throughout the several views of the drawings.

DETAILED DESCRIPTION OF THE PREFERRED EMBODIMENT

Figure 1:
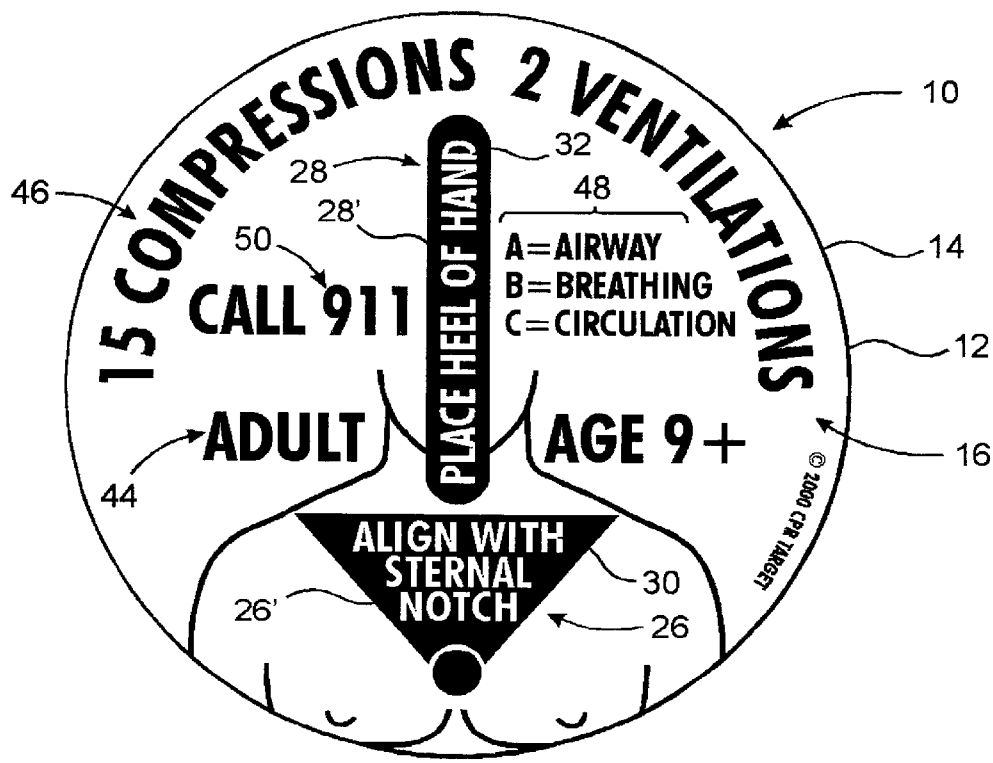
FIG. 1 is one embodiment of an alignment device structured to facilitate the proper orientation of an individual performing CPR relative to the person being treated.

The present invention is directed towards an alignment device, as well as a kit assembly incorporating at least one such alignment device, intended to facilitate the performance of CPR by an individual, preferably, but not necessarily, one who has had some training in first aid and/or CPR, whether in an amount sufficient to obtain a recognized certification or not. It is pointed out that for those individuals who have received at least some training in first aid and/or CPR, the present invention may effectively act as a reminder for the various steps that should be followed, as the stress encountered in an actual emergency or life threatening situation could unnerve some people enough to cause them to forget some of or the basic steps or procedures involved. It is also pointed out, however, that even a person who has had no training in CPR may be able to effectively utilize the present invention in a life threatening or other emergency in that one of the objects of the present invention is to provide an easy to use device for assisting with the administering of CPR and/or first aid.

More specifically, the present invention is directed towards an alignment device generally indicated as 10 which comprises a disk 12, as shown in FIG. 11 formed of a flexible material and structured to normally assume what may be considered a substantially planar configuration. In a preferred embodiment, the disk 12 is made of a foam material with an adhesive backing on its undersurface 18, described more in detail below, and a outer surface 16 having a non-glossy finish to which indicia may be applied, also described below in greater detail, with an overall thickness of generally about one-sixteenth of an inch. Further, the disk 12 preferably has a surrounding, circularly configured peripheral edge 14 and an outer exposed surface generally indicated as 16. The disk 12 also includes an oppositely disposed rear or undersurface generally indicated as 18 and shown in FIG. 6. The alignment device 10 may comprise a plurality of different embodiments as shown in FIGS. 1 through 4. For purposes of clarity, each of these embodiments comprise a disk 12 preferably having substantially equivalent structures including a circular outer periphery 14 and an outer surface 16 and undersurface 18. It is emphasized that the specific dimensions and configurations of the various disks of the embodiments of FIGS. 1 through 4, may vary. However, each of the embodiments must be sufficiently dimensioned and configured to overlie a predetermined frontal portion, generally indicated as 20, of a person 100 on which CPR is being performed. It should be appreciated that FIG. 5 is a schematic representation of only a portion of a person's body and provided to indicate that any of the embodiments of the alignment device 10, as shown in FIGS. 1 through 4, can be accurately disposed in overlying engagement with a frontal portion 20 which is substantially disposed in adjacent and/or predetermined aligned relation to a sternum (not shown) of the person 100.

Figure 5:
FIG. 5 is a side view showing the positioning of any of the embodiments of FIGS. 1 through 4, relative to a person on whom CPR is to be performed.
Figure 6:
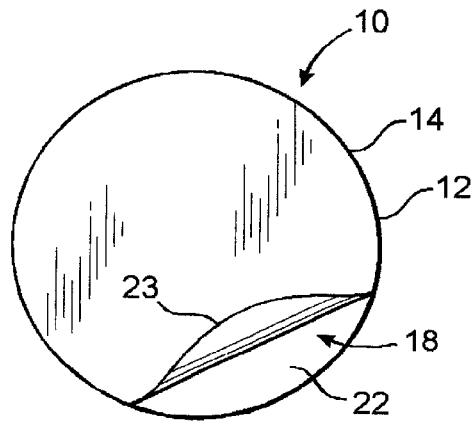
FIG. 6 is a bottom view of any one of the embodiments of FIGS. 1 through 4.

In applying the device 10 in the preferred position shown in FIG. 5, it is important that once properly aligned and positioned, as described in greater detail hereinafter, the device 10 should not become inadvertently dislodged or displaced. Accordingly, and as shown in FIG. 6, each of the disks 12 preferably includes an adhesive material 22 extending over its undersurface 18. The adhesive can be defined by any one or more of a plurality of different compositions which are specifically designed to prevent or at least minimize any irritation when applied directly to the skin of a person being treated. Such adhesive may be of the type manufactured by Acutek Company of Englewood, Calif. Naturally, the adhesive 22 applied to the under surface 18 is not limited to the aforementioned adhesive products manufactured by the above noted corporation. Also, a protective liner 23 is removably secured in overlying relation to the adhesive composition 22 so as to prevent the disk 12 from becoming inadvertently attached to other objects when being stored.

One feature of the various embodiments of the alignment device 10, as shown in FIGS. 1 through 4, is the inclusion of indicia formed on the outer exposed surface 16, such as by silk screening or any other applicable means of formation of such indicia. The indicia preferably comprises an alignment indicator generally indicated as 26 and a position indicator generally indicated as 28. The alignment indicator 26 is disposed on the outer surface 16 so as to indicate an accurate orientation and position of the disk 12 on the person 100 in adjacent or aligned relation with the sternum or other frontal portion 20 of the person 100. The indicated frontal portion 20 may serve as a reference location for accurately orienting an attending individual in the proper and accurate performance of CPR. The position indicator 28 is cooperatively aligned and/or oriented relative to the alignment indicator 26 and is disposed, dimensioned, and configured so as to provide an indication of the placement of at least one hand of an individual who is performing the CPR. In typical fashion, the position indicator 28 indicates the proper positioning of the heel of the hand, in order that the plurality of repeated compressions may be applied at the proper location on the body of the person 100.

Figure 2:
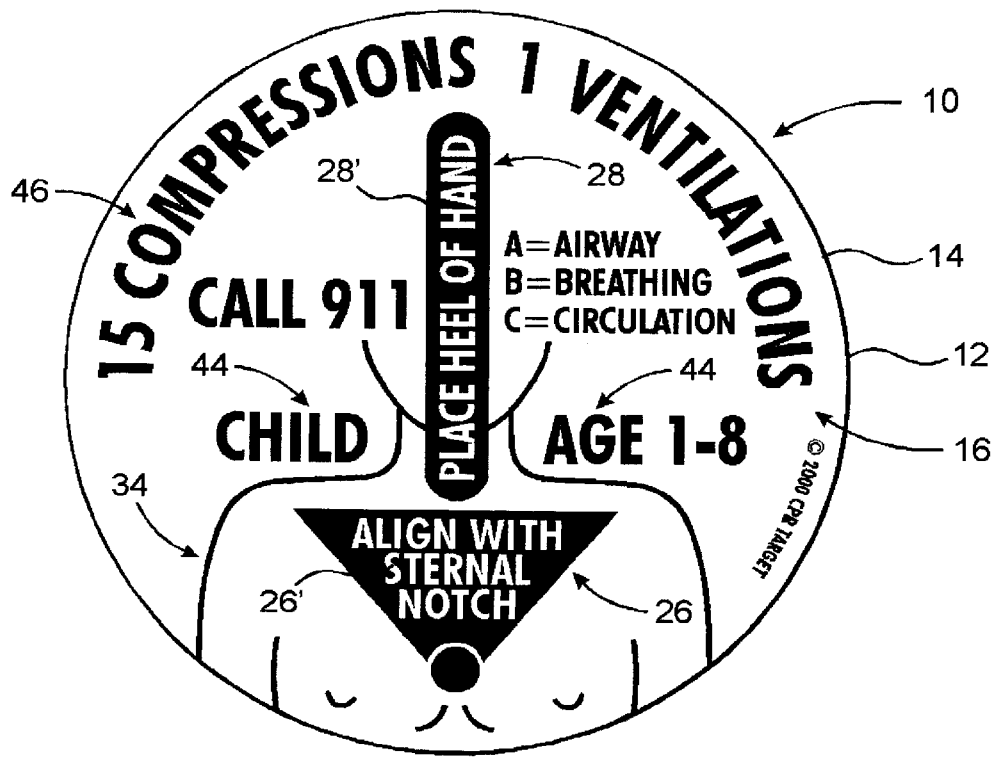
FIG. 2 is another embodiment of the alignment device differing from the embodiment shown in FIG. 1.

In at least one embodiment, but preferably in both the embodiments of FIGS. 1 and 2, the alignment indicator 26 and the position indicator 28 are cooperatively disposed, dimensioned and otherwise structured so as to define a marker element, which has a configuration at least partially resembling an arrow. As shown, the head portion 26' of the arrow defines the alignment indicator 26 and the tail portion 28' defines the position indicator 28. Additional informative indicia in the form of instructional words as at 30 and 32 may also be included on the alignment and position indicators 26 and 28 respectively, in order to further instruct an individual as to the proper alignment of the disk 12 and the positioning of the heel of the hand, as set forth above. Further, the marker element, in the form of the arrow, is located relative to a schematic representation 34 of an upper torso portion of a person's body, so as to further facilitate the location of a predetermined body portion such as the "sternal notch".

By way of further explanation, it is well accepted in the proper practice of CPR that a plurality of repeated compressions are continuously performed and are periodically interrupted by the performance of one or more "ventilations". The term ventilation may be defined by a breath of air being forced into the lungs of the person 100, by an individual performing the CPR procedure. The air flow into a victim's body is typically accomplished by means of "mouth-to-mouth" resuscitation, wherein the exhaled breath from an individual performing CPR is forced into the lungs of the person 100 being treated, by first closing the passage of the nose and forcing breath through the mouth of the person 100. While such mouth-to-mouth resuscitation can be performed directly by an individual placing his or her mouth in direct, substantially sealing contact with the mouth of the person 100, it may be preferable to utilize a breathing apparatus. The breathing apparatus eliminates direct mouth-to-mouth contact but efficiently forces the breath of the individual into the mouth and lungs of the person 100 being treated. Such breathing apparatus may take a variety of different structural configurations and will be described in greater detail hereinafter, particularly with regard to FIG. 7.

Figure 3:
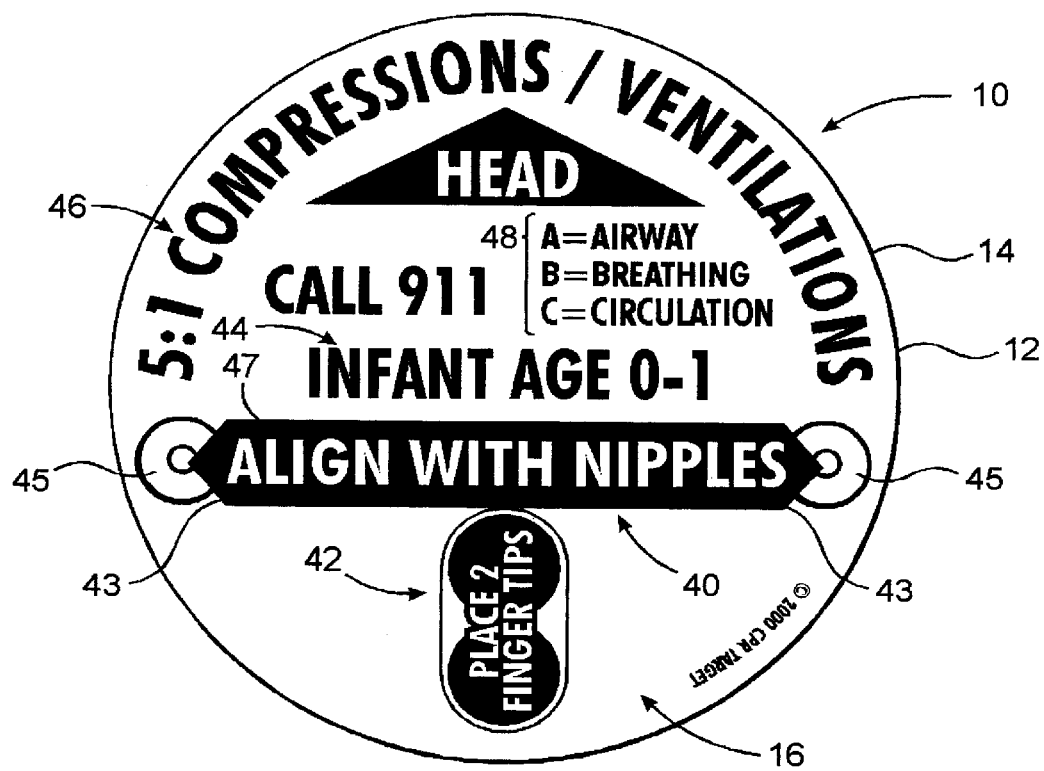
FIG. 3 is yet another embodiment of the present invention differing from the embodiment of FIGS. 1 and 2.
Figure 3A:
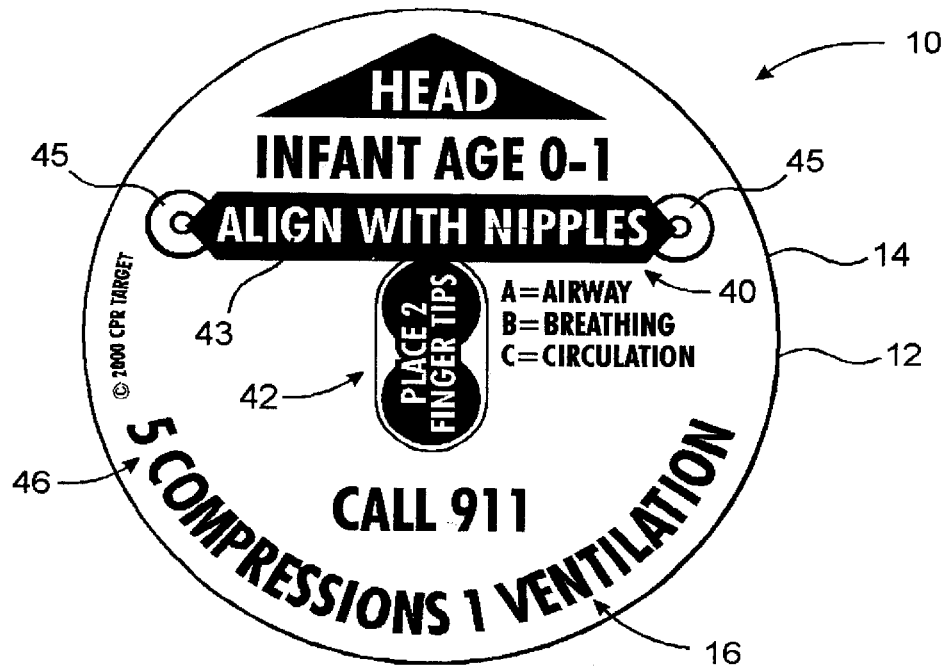

With regard to the embodiment of the invention illustrated in FIG. 3, the alignment device 10 preferably includes the aforementioned indicia comprising an alignment indicator 40 and a position indicator 42. The alignment indicator 40 is preferably in the form of an elongated band or strip terminating at opposite ends, each having a pointed configuration 43. The alignment indicator 40 is disposed in direct alignment with spaced apart indicating structures 45 which, as indicated by the instructional information 47, are intended to be disposed in a linear relation between the nipples of a person 100. As further indicated by other instructional information included as part of the aforementioned indicia, the embodiment of FIG. 3 is meant to be used primarily with an infant below the age of one year. Accordingly, when the alignment indicator 40, including its various components 43, 45, etc. are properly disposed on an infant individual, the position indicator 42 is automatically disposed so as to receive two adjoining fingers of an individual performing CPR. This will locate the aforementioned lower half of the infant's sternum and thereby indicate to the individual performing the CPR procedure, the correct location for placement of the two fingers of the hand of the individual, in order to properly perform the plurality of repeated compressions, as described above. In addition, and as can be noted from FIG. 3-A, the embodiment intended for use with an infant will ideally include a smaller configuration and/or diameter than the embodiments intended for use with an adult or older child so as to better correspond with the reduced dimensions and space found on an infant's chest.

The indicia, as shown in the embodiments of FIGS. 1 through 4, also comprises a plurality of additional instructional information represented by the various words and/or numerals, including but not limited to the intended age group 44, of the individual on which the disk 12 is to be placed and the ratio of compressions to ventilations 46, which is primarily dependent upon the size and age of the individual as set forth above. Other more general instructional information includes preliminary steps to be taken, such as checking the air way, determining the existence of breathing and circulation, as generally indicated at 48 and information relating to the universally recognized emergency number "911", as generally indicated as 50.

Figure 4:
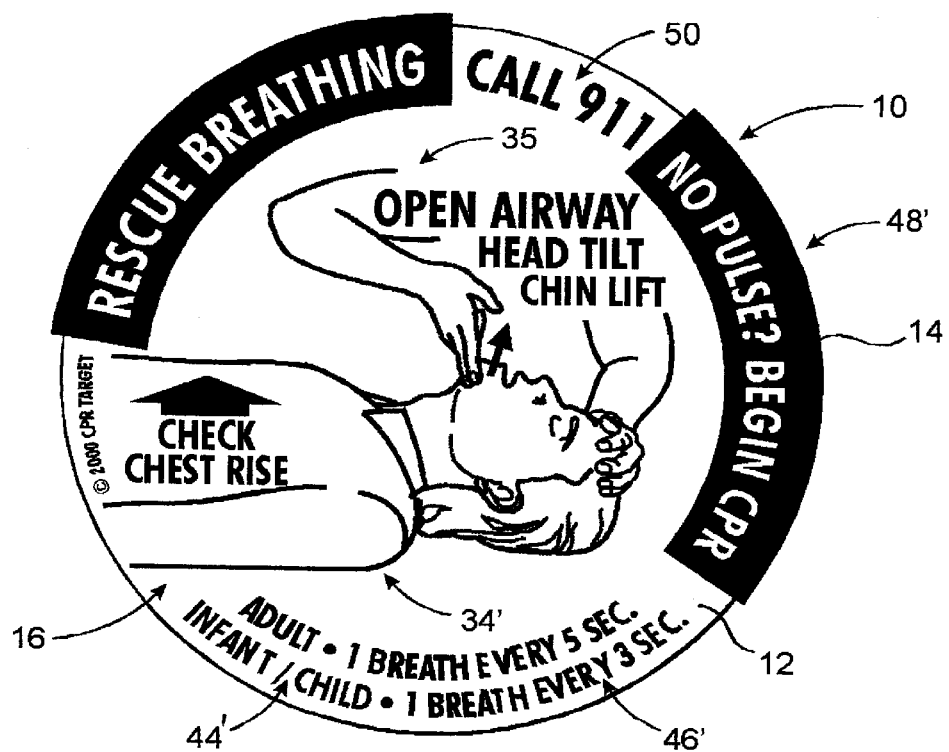
FIG. 4 is yet another embodiment of the present invention differing from the embodiment of FIGS. 1 through 3.

With regard to the indicia appearing on the outer surface 16 of the embodiment of FIG. 4, the instructional information is arranged somewhat differently and presented in a different format in order to emphasize the versatility of the alignment device 10 of the present invention. Such instructional information is primarily directed to "rescue breathing" of an individual schematically represented as 34' in FIG. 4 and the proper positioning and orientation thereof by an individual at a least partially represented as 35. This instructional information includes the intended age of the person being treated as at 44', as well as the frequency of forced breathing as at 46' and also includes the more generalized steps in the procedure necessary to accurately perform the rescue breathing. Ideally, the device 10 intended for rescue breathing will have indicia which includes a color scheme in blue, also known as "airway blue", while the disks 12 illustrated in FIGS. 1–3 intended for use with CPR may include a red color scheme, so as to better aid a person with quickly determining which device 10 or disk 12 is appropriate for use in an emergency. As shown in FIG. 4, the device 10 intended for rescue breathing will ideally also include an advisory 48' to the effect that if the person to whom rescue breathing is being applied has no pulse or should reach a point where he or she no longer has a pulse, that then CPR procedures should begin.

Figure 7:
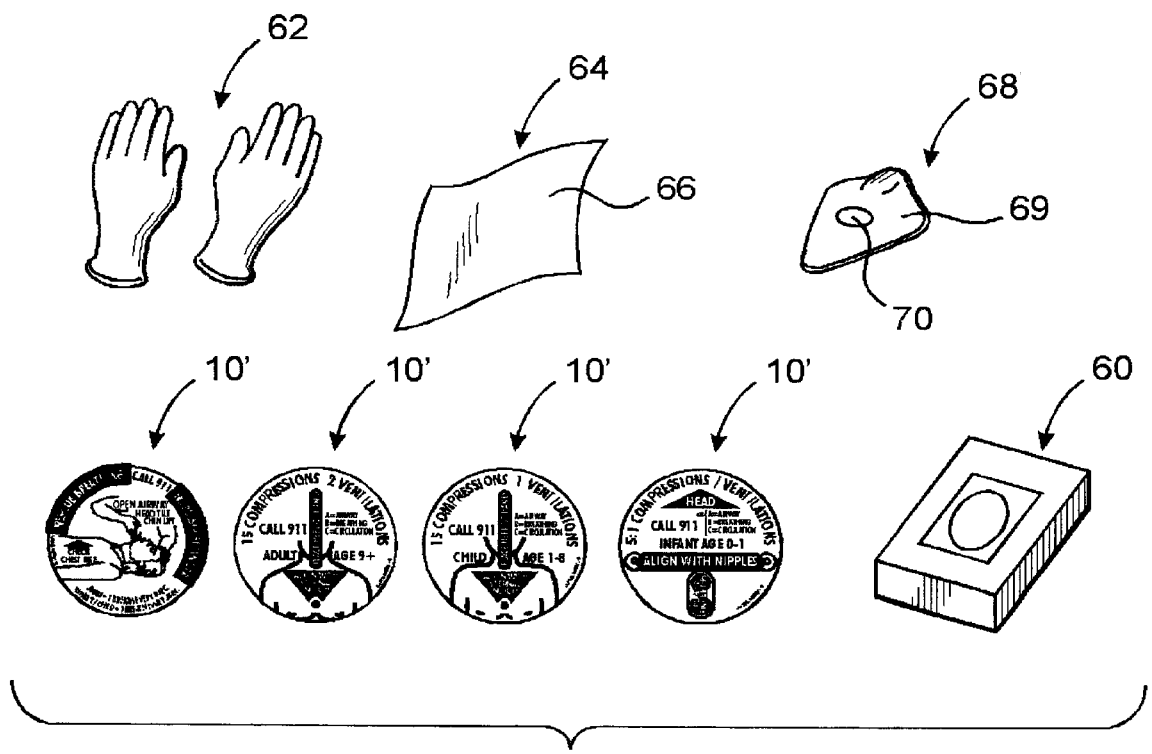
FIG. 7 is a composite view of a plurality of components or devices to be included within and at least partially defining a kit assembly designed to facilitate the performance of CPR on a person.

Yet another embodiment of the present invention is collectively represented in FIG. 7, wherein a kit assembly is provided to facilitate the proper performance of CPR. Such kit assembly preferably includes some type of container or packaging, generally indicated as 60 which is sufficiently dimensioned and configured to contain the remainder of the components of the type disclosed in FIG. 7. More specifically, the kit assembly of the present invention includes at least one alignment device 10', but will preferably include a plurality of such alignment devices 10' directed to both to rescue breathing and CPR. Each of the plurality of alignment 10 devices directed to CPR are appropriately dimensioned and configured and includes corresponding indicia which facilitates the performance of CPR on a person of a particular age group (adult, child, infant), as set forth above. Similarly, the kit assembly may include at least one device or disk 12 which is appropriately dimensioned and configured for temporary adherence to the chest of a person in need of medical attention and which includes indicia to aid an individual in administering mouth-to-mouth breathing to that person. Further components or products to be included within the kit assembly of FIG. 7 and housed within the container or packaging 60 may include at least one pair of gloves, generally indicated as 62. The gloves 62 may be formed of a latex or other applicable material and are commonly known as examination gloves or surgical gloves, such as the type sold by Specific Latex Products ltd. of San Francisco, Calif. In addition, one or more cleaning devices generally indicated as 64 may be included within the kit assembly and be defined by one or more "wipes" or towelettes 66, which are preferably treated with an antiseptic ingredient, such as, but not limited to, an alcohol base solution. The towlettes are of the type made commercially available under the trademark VIONEX and produced by Viro Research International, Inc. Also a breathing apparatus generally indicated as 68 may be included within the kit assembly of FIG. 7. The breathing apparatus 68 may take the form of a mask type structure 69, which has somewhat of a domed or cup like configuration so as to be sealingly disposed in overlying relation about the nose and mouth of the person 100. Typically, the breathing mask 69 may include a breathing tube or flow path 70 which incorporates a one way valve (not shown) for effectively regulating one or more "ventilations" generated by the individual performing CPR and directed into the mouth and lungs of the person being treated. Breathing apparatus or other airway management products typically used for this purpose are available from Laerdal Products. Naturally, the breathing apparatus or assembly 68 may comprise a variety of other structures which effectively direct air flow into the individual 100, while at the same time preventing or at least restricting contact between the mouths of the individual performing CPR and the person being treated, as well as the exchange of any body fluids there between.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An alignment device structured to facilitate the performance of cardiopulmonary resuscitation on a person, said device comprising:
    a) a disk formed of an at least partially flexible material,
    b) said disk including a sufficiently large dimension to be positioned in overlying engagement with a predetermined frontal area of the person's body,
    c) indicia formed on an outer surface of said disk, and
    d) said indicia including at least one alignment indicator disposed to accurately orient said disk on the person in a position to properly perform CPR.

2. A device as recited in claim 1 wherein said disk comprises a normally flat, planar configuration formed of a unitary one piece construction.

3. A device Us recited in claim 2 wherein said disk includes an outer peripheral edge disposed in surrounding coplanar relation with said otter surface.

4. A device as recited in claim 3 wherein said outer peripheral edge comprises a circular configuration.

5. A device as recited in claim 3 wherein said disk includes sufficient flexibility to conform to the outer contour of the frontal area which it overlies.

6. A device as recited in claim 1 wherein said disk includes sufficient flexibility to conform to the outer contour of the frontal area of the person's body which it overlies.

7. A device as recited in claim 1 wherein said indicia further includes a position indicator disposed on said outer surface and structured to accurately position a hand of one performing CPR on the person.

8. A device as recited in claim 7 wherein said alignment indicator and said position indicator are disposed in adjacent relation to one another and collectively define a marker element.

9. A device as recited in claim 8 wherein said marker element is disposed on said outer surface to establish aligned orientation with a predetermined portion of the person's body.

10. A device as recited in claim 7 wherein said indicia further comprises instructional information for correctly performing CPR.

11. A device as recited in claim 7 wherein said alignment indicator is disposed on said outer surface to establish aligned orientation with the sternal notch of the person's body.

12. A device as recited in claim 11 wherein said position indicator is disposed and configured on said outer surface to accurately position the heel of the hand of one performing CPR on the person.

13. A device as recited in claim 7 wherein said alignment indicator is disposed on said outer surface to establish aligned orientation with the nipples of the person.

14. A device as recited in claim 13 wherein said position indicator is disposed and configured on said outer surface to accurately position two fingers of the hand of one performing CPR in an orientation to accurately locate the sternum.

15. A device as recited in claim 1 wherein said indicia further comprises instructional information for correctly performing CPR, said instructional information being selectively variable at least partially depending on the age of the person.

16. An alignment device structured to facilitate the performance of cardiopulmonary resuscitation on a person, said device comprising:
    a) a disk formed of an at least partially flexible material and including a sufficiently large dimension to be positioned in overlying relation to a predetermined frontal area of the person in general alignment with the sternum,
    b) said disk including sufficient flexibility to conform to the outer contour of the predetermined frontal area of the person which it overlies,
    c) said disk comprising a normally flat, planar configuration having oppositely disposed outer surfaces and a one piece construction, said disk including an outer peripheral edge disposed in surrounding coplanar relation with said outer surfaces,
    d) indicia formed on at least one of said outer surfaces of said disk and including at least one alignment indicator and at least one position indicator,
    e) said alignment indicator disposed to accurately orient said disk on the person in a position to properly perform CPR,
    f) said position indicator disposed on said at least one outer surface and structured to accurately position at least a portion of a hand of one performing CPR on the person, and g) said alignment indicator and said position indicator being disposed in adjacent relation to one another and collectively defining a marker element, said marker element disposed on said at least one outer surface to establish aligned orientation with a predetermined portion of the person's body.

17. A device as recited in claim 16 wherein said indicia further comprises different instructional information for correctly performing CPR, at least partially selected depending on the age of the person.

18. A device as recited in claim 16 wherein said disk further comprises an adhesive composition formed on one of said outer surfaces oppositely disposed to said indicia, said adhesive composition structured to removably secure said disk to the person.

19. A kit assembly designed to facilitate the performance of CPR on a person said assembly comprising:
   a) at least one disk dimensioned and configured to be disposed in overlying relation to a frontal portion of the person substantially adjacent the sternum,
   b) said disk including indicia formed on at least one outer surface thereof, said indicia including an alignment indicator and a position indicator respectively structured and disposed to facilitate orientation and positioning of at least a portion of a hand of one performing CPR on the person,
   c) a pair of gloves to be worn by one performing the CPR on the person, and
   d) a breathing apparatus structured to establish air flow between the one performing CPR and the person during performance of mouth to mouth resuscitation.

20. A kit assembly as recited in claim 19 further comprising a plurality of discs wherein the dimension and configuration of each of said plurality of disks may vary dependent on the age of the person.

21. A kit assembly as recited in claim 19 further comprising a plurality of discs wherein the indicia on each of said plurality of disks may vary dependent on the age of the person.

22. A kit assembly as recited in claim 19 wherein said alignment indicator and said position indicator are disposed in adjacent relation to one another and collectively define a marker element, said marker element disposed on said at least one outer surface to establish aligned orientation with the sternal notch of the person.

23. A kit assembly as recited in claim 19 further comprising a plurality of disks each structured to be applied to a person of a different age group.

24. A kit assembly as recited in claim 23 wherein said indicia on each of said plurality of disks further comprises instructional information directed to correctly performing CPR on the person within the corresponding age group.

25. A kit assembly as recited in claim 24 wherein each of said plurality of disks include said alignment indicator and said position indicator adjacently disposed to collectively define a marker element, said marker element configured to indicate the location of the sternal notch of the person and the position of the hands of one performing CPR on the person.

26. A kit assembly as recited in claim 24, wherein one of said disks includes said alignment indicator and said position indicator adjacent disposed to collectively define a marker element configured to locate the sternum of an infant and the position of at least two fingers of the hand of one performing CPR on the infant.

27. A kit assembly as recited in claim 19 further comprising a cleaning member including an antiseptic ingredient and structured to clean portions of the one performing CPR or portions of the person.

28. A kit assembly as recited in claim 19 wherein said breathing apparatus comprises a mask including a one way valve disposed and structured to regulate air flow from the one performing CPR to the person.

\* \* \* \* \*